United States Patent
Huebner et al.

(10) Patent No.: US 11,813,922 B2
(45) Date of Patent: Nov. 14, 2023

(54) EXPANSION VALVE

(71) Applicant: Mahle International GmbH, Stuttgart (DE)

(72) Inventors: Steffen Huebner, Leonberg (DE); Matthias Lindenberg, Stuttgart (DE); Jeffrey Van Delden, Stuttgart (DE); Florian Wetzel, Baltmannsweiler (DE)

(73) Assignee: Mahle International GmbH

( * ) Notice: Subject to any disclaimer, the term of this patent is extended or adjusted under 35 U.S.C. 154(b) by 0 days.

(21) Appl. No.: 17/539,180

(22) Filed: Nov. 30, 2021

(65) Prior Publication Data

US 2022/0176783 A1   Jun. 9, 2022

(30) Foreign Application Priority Data

Dec. 3, 2020 (DE) .................. 102020215275.6

(51) Int. Cl.
  *B60H 1/00* (2006.01)
  *B60H 1/32* (2006.01)
  *F25B 49/00* (2006.01)
  *F25B 41/31* (2021.01)

(52) U.S. Cl.
  CPC ....... *B60H 1/00978* (2013.01); *B60H 1/3225* (2013.01); *F25B 41/31* (2021.01); *F25B 49/005* (2013.01); *F25B 2600/2513* (2013.01)

(58) Field of Classification Search
  CPC .............. F25B 41/31; F25B 49/005; F25B 2600/2513; F25B 49/02; F25B 41/35; F25B 41/345; F16K 31/0675; F16K 37/0041; F16K 37/005
  See application file for complete search history.

(56) References Cited

U.S. PATENT DOCUMENTS

| | | | |
|---|---|---|---|
| 10,352,475 B2 | 7/2019 | Uehara | |
| 11,329,531 B2 | 5/2022 | Billet | |
| 2016/0146366 A1* | 5/2016 | Takahashi | F16K 3/00 251/129.15 |
| 2016/0313037 A1* | 10/2016 | Takahashi | H02P 8/30 |
| 2019/0178404 A1* | 6/2019 | Zhang | H02P 29/02 |

(Continued)

FOREIGN PATENT DOCUMENTS

| CN | 101328977 A | 12/2008 |
|---|---|---|
| CN | 108692096 A | 10/2018 |

(Continued)

OTHER PUBLICATIONS

English abstract for DE-102019206197.

(Continued)

*Primary Examiner* — Kun Kai Ma
(74) *Attorney, Agent, or Firm* — Fishman Stewart PLLC

(57) ABSTRACT

An expansion valve for an air conditioning system of a motor vehicle may include a housing, a sensor, a stepping motor or a BLDC motor, a valve seat, and a valve body. The stepping motor or the BLDC motor may include a rotor and a stator surrounding the rotor. The rotor may include a permanent magnet body connected non-rotatably therewith. A separating can may be provided that surrounds the rotor and separates a wet region on a rotor side from a dry region on a stator side. The sensor may be connected with the separating can via an adhesive layer formed as a heat-conductive layer.

18 Claims, 1 Drawing Sheet

(56) References Cited

U.S. PATENT DOCUMENTS

2020/0232690 A1* 7/2020 Lan .................. F25B 41/35
2022/0214090 A1 7/2022 Moser

FOREIGN PATENT DOCUMENTS

| | | | |
|---|---|---|---|
| CN | 109611605 A | | 4/2019 |
| CN | 209229105 U | | 8/2019 |
| CN | 111512079 A | | 8/2020 |
| DE | 102019206197 A1 | | 11/2020 |
| EP | 3 392 538 A1 | | 10/2018 |
| JP | 2003-42325 A | | 2/2003 |
| JP | 2003042325 A | * | 2/2003 |
| JP | 2003329698 A | | 11/2003 |
| JP | 2006322689 A | | 11/2006 |
| WO | 2020221784 A1 | | 11/2020 |

OTHER PUBLICATIONS

English abstract JP-2003-42325.
English abstract for JP-2003329698.
Elecolit—elektrisch/thermischleitfaehige Klebstoffe; Panacol-Elosol GmbH; Oct. 2018.
German Search Report for DE-102020215275.6, dated Nov. 4, 2021.
Chinese Office Action dated Aug. 30, 2023 and Chinese Search Report dated Aug. 23, 2023 for Chinese Patent Application No. 202111457262.7.

* cited by examiner

EXPANSION VALVE

CROSS-REFERENCE TO RELATED APPLICATION

This application claims priority to German Application No. DE102020215275.6, filed on Dec. 3, 2020, the contents of which is hereby incorporated by reference in its entirety.

TECHNICAL FIELD

The present invention relates to an expansion valve for an air conditioning system of a motor vehicle. The invention relates, in addition, to an air conditioning system of a motor vehicle with such an expansion valve.

BACKGROUND

From EP 3 392 538 A1 an electrically actuatable valve with a rotor and with a stator, separated therefrom via a separating can, is known. A sensor is provided in order to detect a rotation angle position of the rotor.

Expansion valves, also designated as throttle valves, are valves which reduce the pressure of a through-flowing fluid by a local constriction of a flow cross-section and thereby bring about a volume increase or respectively expansion. In air conditioning systems, in particular in motor vehicles, such an expansion valve reduces the pressure of a refrigerant which usually penetrates into the expansion valve as an almost boiling liquid. In so doing, it undergoes an isenthalpic change of state because the refrigerant expands on passing through the expansion valve (pressure drop of e.g. 10 bar to 1 bar with simultaneous drop in the liquid temperature). The aim of the expansion in the valve is that the liquid arrives (still liquid) into the evaporator with low overheating. Furthermore, the refrigerant arrives into the evaporator, in which the evaporation process of the liquid component of the refrigerant receives heat from the environment and thereby evaporates. The fluid or respectively air flowing through the evaporator (heat exchanger) is thereby cooled.

However, in the electric expansion valves known from the prior art, it is disadvantageous that an exact detection of a valve position is often only possible with difficulty.

The present invention is therefore concerned with the problem of indicating, for an electric expansion valve, an improved or at least an alternative embodiment, by which in particular the disadvantages known from the prior art can be overcome.

This problem is solved according to the invention by the subject of the independent claim 1. Advantageous embodiments are the subject of the dependent claims.

SUMMARY

The present invention is based on the general idea of connecting a sensor for the detection of a rotation angle position of a rotor of an expansion valve, connected to a valve body, via a heat-conductive layer, with a separating can, which separates the rotor, having a permanent magnet body, from the sensor, and thereby compensating temperature differences between the permanent magnet body, the separating can and the sensor and, as a result, also compensating different, temperature-related thermal expansions, whereby a particularly exact detection of the position of the rotor and thus of the valve body connected therewith and again thus an opening state of the expansion valve are able to be detected. The expansion valve according to the invention is used here for example in an air conditioning system, in a battery cooler and/or in an oil cooler of a motor vehicle and has a housing in which a stepping motor or a BLDC motor (brushless e-motor) and a valve seat and a valve body, interacting therewith, are arranged. The stepping motor or respectively the BLDC motor has a rotor and a stator surrounding the latter, wherein the rotor has a permanent magnet body connected non-rotatably therewith. The sensor, in turn, is arranged on a control board and is separated from the rotor by a separating can. The separating can surrounds the rotor and, in so doing, separates a wet region on the rotor side from a dry region on the stator side, wherein the sensor is arranged in the dry region on the stator side and thus in a protected manner. According to the invention, the sensor is connected to the separating can via a heat-conductive adhesive layer. This heat-conductive layer brings it about that the sensor is not separated from the separating can by an air layer and is thereby insulated thermally from the separating can. Through the heat-conductive connection via the adhesive layer, the sensor thus has at least substantially the same temperature as the separating can and the rotor of the stepping motor arranged therein. Due to the circumstance that a temperature difference between the sensor and the separating can does not exist or respectively is only marginal, temperature-related thermal expansions which arise through a heated fluid in the wet region and act on the rotor and its permanent magnet body are minimized, whereby a particularly exact detection of a position of the permanent magnet body or respectively of the rotor and of the valve body connected therewith is possible whereby, in turn, a particularly exact detection of an opening- or respectively closing state of the expansion valve is possible. By means of a heat-conductive adhesive layer connecting the sensor with the separating can, an absolute distance between sensor and separating can or respectively between sensor and permanent magnet of the rotor can also remain constant, whereby relative influences on the distance which can lead to inaccuracies with regard to the detection of an opening state or the expansion valve, can be minimized, in particular can even be ruled out. Through an initial teach-in of each expansion valve, in addition a tolerance-related distance between sensor and separating can can also be eliminated.

In particular, heat-conductive elastomers or respectively heat-conductive foams come into consideration here as heat-conductive layer or respectively adhesive layer between the sensor and the separating can. "Thermal interface materials", abbreviated as "TIM", can also be used as heat-conductive layer or respectively adhesive layer. These are frequently produced on the basis of polymer resins (silicones) with additional fillers (chemical binders). Liquids which are like or similar to adhesive can also be used, in the processing of which as few air bubbles as possible are to be introduced, because these again impair the thermal conductivity. Many of these materials have, in addition, the great advantage of a mechanical vibration decoupling between the sensor and the separating can, whereby the vibration influences on the sensor, which can also lead to measurement inaccuracies, can also be minimized.

In an advantageous further development of the solution according to the invention, the sensor is formed for the detection of a magnetic field generated by the permanent magnet body, in particular of an intensity of the magnetic field and/or of a direction vector thereof. Such a sensor can be formed for example as a so-called Hall sensor, in particular as a so-called 3D Hall sensor, by means of which a comparatively simple spacing- or respectively distance measurement and/or a rotation angle change, which can be directly converted into a degree of opening of the expansion valve, can be detected. By means of such 3D Hall sensors, in addition it is possible to enable a contactless and touch-free distance detection, which makes it possible in the first place to arrange the sensor in the dry region of the expansion valve, while the rotor or respectively the permanent magnet body are arranged in the wet region. By means of such a sensor, in addition it is possible to detect all spatial directions with a single sensor, which presents not only advantages with regard to cost, but also advantages with regard to installation space. A further great advantage of such Hall sensors consists in that these also deliver a signal in so far as the magnetic field in which the Hall sensor is situated is constant. This permits a comparatively simple detection of a rotation angle position of the rotor and thus of an opening state of the expansion valve.

In an advantageous further development of the solution according to the invention, the sensor is formed for the detection of a temperature of the sensor and/or of the permanent magnet body. Through the temperature detection it is in turn possible to calculate temperature-related influences, such as for example material-related different thermal expansions, herefrom and to thus eliminate them, whereby also the detection of an opening state of the expansion valve according to the invention can be improved.

In a further advantageous embodiment of the solution according to the invention, the sensor is formed for the detection of an axial position and/or of a rotation angle of the magnet body. Basically two different embodiments exist here, namely one in which the permanent magnet body moves in axial direction on a rotating together with a valve body and thereby opens or respectively closes the expansion valve, and one in which on a rotating of the permanent magnet body, the latter remains in an identical axial position and only the valve body moves in axial direction owing to a thread situated between the permanent magnet body and the valve body, and thereby opens or respectively closes the expansion valve. Of course, it is also conceivable here that the sensor detects exclusively a rotation angle position of the permanent magnet body, because solely herewith, independently of the interaction of the permanent magnet body with the valve body, an opening position of the valve body and thus an opening position of the expansion valve is able to be detected.

In an advantageous further development of the invention, the permanent magnet body is formed in a pot-shaped manner and has a signal generator region and a rotor region. The signal generator region preferably faces the sensor here, whereas the rotor region can surround a shaft. Due to the circumstance that the rotor region of the permanent magnet body is arranged spaced apart in a ring-shaped manner around the shaft, a portion of the shaft can be arranged within the rotor region of the permanent magnet body and thereby accommodated in a space-saving manner.

Expediently a storage device is provided for recording the temperatures which are measured by the sensor. By means of such a storage device, a documentation of a temperature profile is possible, wherein the storage device can be formed, in addition, for recording the rotation angle of the permanent magnet body measured by the sensor and thus of the opening state of the expansion valve. Through a simultaneous storing both of the temperature and also of the opening state of the expansion valve, it is possible, by a corresponding evaluation, to also filter out temperature-related thermal expansions and thus inaccuracies.

The present invention is further based on the general idea of equipping an air conditioning system of a motor vehicle with such an expansion valve and thereby enabling a particularly exact and in particular temperature-independent detection of an opening state of the expansion valve. Of course, such an expansion valve can also be used in an oil cooler or in a battery cooler with a chiller, a refrigerant-cooling water circuit and a condenser.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

BRIEF DESCRIPTION OF THE DRAWINGS

Preferred example embodiments of the invention are illustrated in the drawings and are explained more closely in the following description, wherein the same reference numbers refer to identical or similar or functionally identical components.

There are shown, respectively schematically.

DETAILED DESCRIPTION

Figure 1:
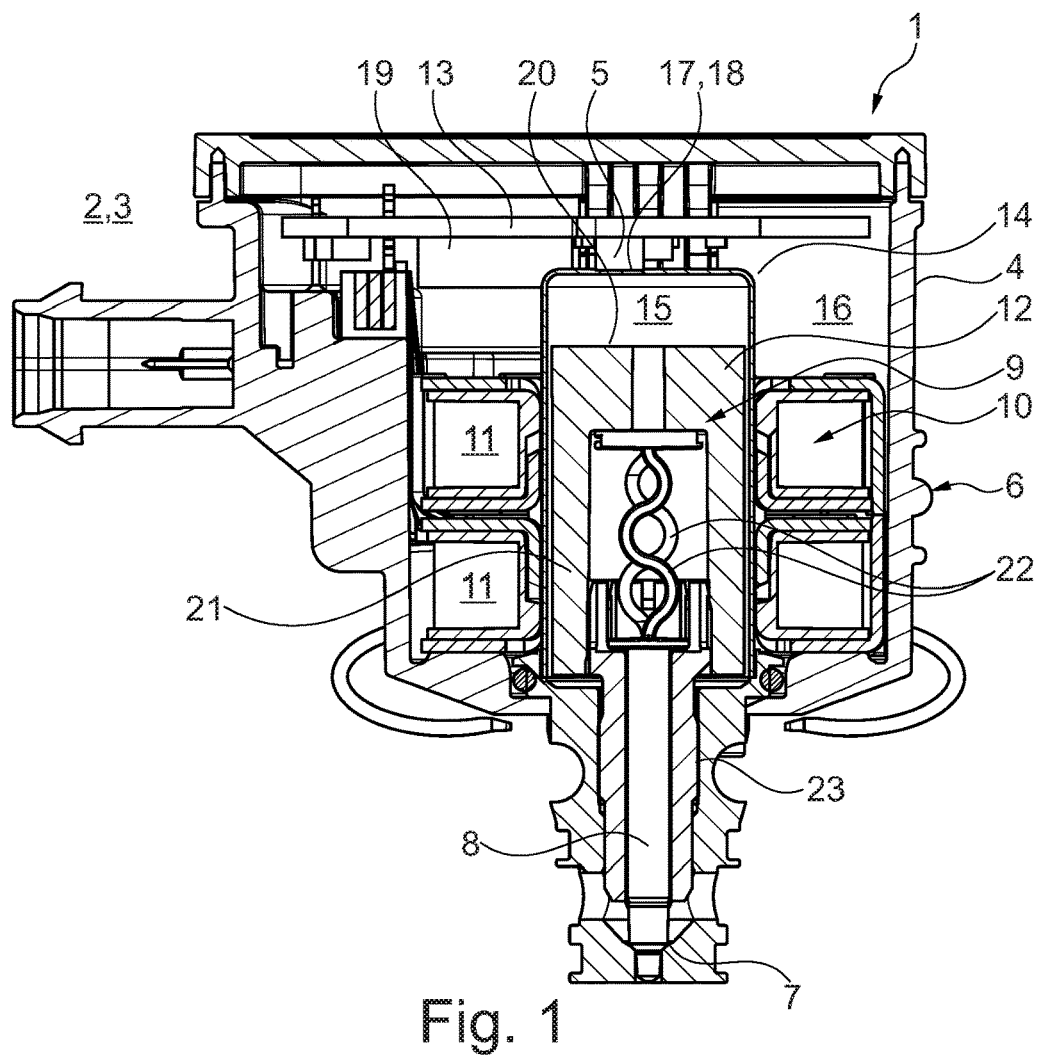
FIG. 1 a sectional view through an expansion valve according to the invention.
Figure 2:
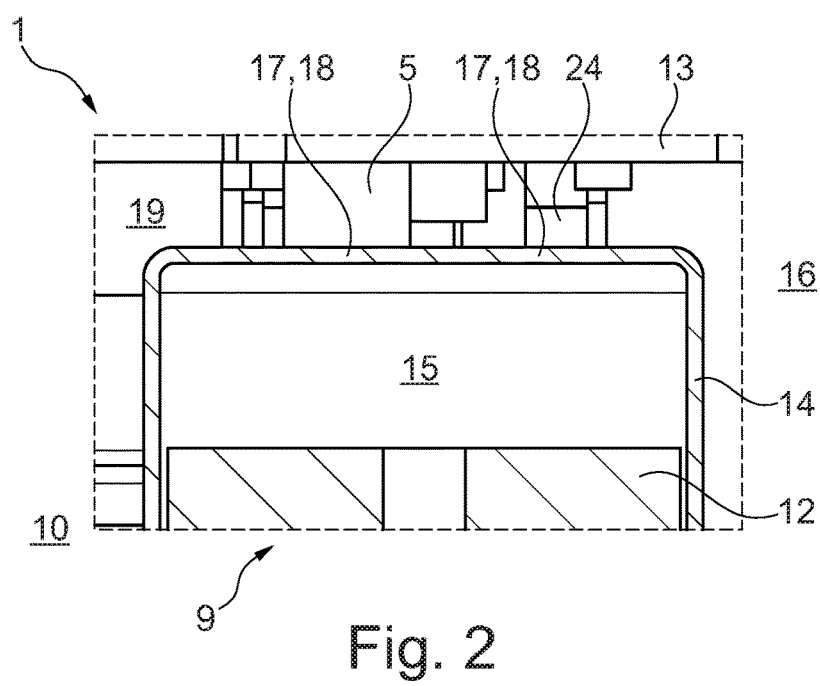
FIG. 2 a detail illustration from FIG. 1 in the region of a sensor connected with a separating can via a heat-conductive layer.

According to FIG. 1, an expansion valve 1 according to the invention for an air conditioning unit 2, a battery cooler and/or an oil cooler of a motor vehicle 3 has a housing 4 in which a sensor 5, for example a 3D Hall sensor, and a stepping motor 6 or respectively a BLDC motor, is arranged. A valve seat 7 and a valve body 8 interacting therewith are also provided. The stepping motor 6 or respectively the BLDC motor has a rotor 9 and a stator 10 surrounding the rotor 9, which stator has two coils 11 for example in the case shown in FIG. 1. The rotor 9 has a permanent magnet body 12, wherein the sensor 5 is arranged on a control board 13.

Furthermore, a separating can 14 is provided, which surrounds the rotor 9 and separates a wet region 15 on the rotor side from a dry region 16 on the stator side. By means of the separating can 14 it is possible to arrange the sensor 5 in the dry region 16 and thus in a protected manner. According to the invention, the sensor 5 is now connected to the separating can 14 via an adhesive layer 18 formed as a heat-conductive layer 17. Hereby, it is possible to enable a thermal and mechanical connection of the sensor 5 to the separating can 14 and thereby to prevent temperature differences between the sensor 5 and the separating can 14, which could lead to inaccuracies in the detection of an opening state of the expansion valve 1. By means of the adhesive layer 18 in particular the occurrence of an insulating air layer lying between the sensor 5 and the separating can 14 is able to be prevented, which, owing for example to higher temperatures in the wet region 15, can lead to a more intensive temperature-related thermal expansion there and thus to measurement inaccuracies.

Through the mechanical coupling of the sensor 5 with the separating can 14, at the same time also an absolute distance remains constant between the sensor 5 and the separating can 14 or respectively the permanent magnet 12, whereby relative influences on the distance can be at least greatly reduced, preferably even eliminated. Through the initial teach-in of each expansion valve 1, a tolerance-related distance between the sensor 5 and the separating can 14 is also set to zero. In order to keep temperature-related thermal expansions of the adhesive layer 18 as small as possible, the latter is formed to be comparatively thin and has, for example, only a thickness d<1 mm, nominally 0.7 mm.

In particular an elastomer, or respectively a foam which is capable of conducting heat, comes into consideration as material for the heat-conductive adhesive layer 18, wherein both materials have not only a good thermal conductivity but in addition can also serve as vibration damper between the sensor 5 on the one hand and the separating can 14 on the other hand.

The sensor 5 is formed here for the detection of a magnetic field generated by the permanent magnet body 12, in particular of an intensity of the magnetic field and/or of a direction vector thereof. Through the detection of a direction vector of the magnetic field of the permanent magnet body 12, its rotation angle position and via this an opening state of the expansion valve 1 can be detected. The sensor 5 can be formed, furthermore, for the detection of a temperature of the sensor 5 and/or of the permanent magnet body 12 or respectively of the separating can 14. By means of a storage device 19 it is possible to record or respectively store at least the temperature measured by the sensor 5, wherein at the same time of course it is also conceivable that the storage device 19, which is able to be read by a corresponding control apparatus, also records an opening state of the expansion valve 1 or respectively an opening position of the valve body 8. Hereby, a position of the expansion valve with an associated temperature is able to be detected and able to be evaluated. Basically, it is also conceivable here that temperature-related changes to the opening position can be detected and subtracted.

A so-called "sensor drift", i.e. a change of magnetic characteristics with a changing temperature can also be better compensated by means of the heat-conductive layer 17 or respectively the adhesive layer 18. The colder the material is, for example, such a sensor drift becomes all the more intensively noticeable. Thereby, a measured field value at different temperatures can represent different location positions of the permanent magnetic body 12 and thus different opening positions. The temperature-related magnetic characteristic values can be corrected by means of software to the nominal temperature, in particular ambient temperature. For this, an additional temperature sensor 24 on the control board 13 is necessary, which can be provided for this on the control board 13. However, so that it can correctly detect the temperature of the permanent magnet body 12, an air gap between sensor 5 or respectively additional temperature sensor 24 and separating can 14 must be "short-circuited" via gap filler, i.e. eliminated as far as possible, which takes place with the heat-conductive layer 17 or respectively the adhesive layer 18.

The permanent magnetic body 12 is formed here in a pot-shaped manner and has a signal generator region 20 and a rotor region 21, wherein the signal generator region 20 faces the sensor 5 and has a 2-pole magnet (north-south). Thereby, not only can the magnetic field intensity of the signal generator region 20 and thus of the permanent magnet body 12 be measured, but also the vectors of the field alignment, whereby a particularly exact detection of the magnetic field by the sensor 5 and thus of a position of the valve body 8, which is operatively connected with the permanent magnet body 12, is made possible.

Between the permanent magnet body 12 and the valve body 8, two waved axial springs 22 are arranged, which pretension the valve body 8 against a threaded bush 23, so that the valve body 8 always has a defined position and cannot move loosely within the rotor.

With the adhesive layer 18, formed according to the invention as heat-conductive layer 17, for the mechanical and thermal coupling of the sensor 5 with the separating can 14, temperature differences between the sensor 5 and the separating can 14 or respectively the permanent magnet 12 can be at least minimized, preferably even eliminated, whereby interferences, which can lead to errors in the detection of the position of the valve body 8, can be at least greatly reduced. Through the mechanical coupling of the sensor 5 with the separating can 14, it is possible, in addition, to keep a relative distance between these two components the same in a temperature-independent manner, whereby also interferences to the detection of the position of the valve body 8 of the expansion valve 1 can be eliminated. The sensor 5 is arranged here directly on the control board 13 and is not connected therewith by means of flexible connections.

The invention claimed is:

1. An expansion valve for an air conditioning system of a motor vehicle, the expansion valve comprising:
    a housing;
    a sensor;
    a stepping motor or a BLDC motor;
    a valve seat; and
    a valve body interacting therewith;
    wherein the stepping motor or the BLDC motor has a rotor and a stator surrounding the rotor;
    wherein the rotor has a permanent magnet body connected non-rotatably therewith;
    wherein a separating can is provided that surrounds the rotor and separates a wet region on a rotor side from a dry region on a stator side;
    wherein the sensor is connected with the separating can via an adhesive layer formed as a heat-conductive layer; and
    wherein the sensor is configured to detect a temperature of the sensor and/or of the permanent magnet body.

2. The expansion valve according to claim 1, wherein the sensor is configured to detect a magnetic field generated by the permanent magnet body.

3. The expansion valve according to claim 1, wherein the permanent magnet body is formed in a pot-shaped manner and has a signal generator region and a rotor region.

4. The expansion valve according to claim 3, wherein the signal generator region faces the sensor.

5. The expansion valve according to claim 1, wherein a storage device is provided for recording the temperature measured by the sensor.

6. An air conditioning system of a motor vehicle, comprising:
    the expansion valve according to claim 1.

7. The expansion valve according to claim 2, wherein the sensor is configured to detect an intensity of the magnetic field.

8. The expansion valve according to claim 2, wherein the sensor is configured to detect a direction vector of the magnetic field.

9. The expansion valve according to claim 1, wherein the sensor is configured to detect a temperature of the permanent magnet body.

10. The expansion valve according to claim 1, wherein the sensor is configured to detect a rotation angle of the permanent magnet body.

11. The expansion valve according to claim 9, wherein a storage device is provided for recording the temperature measured by the sensor.

12. The expansion valve according to claim 1, wherein the adhesive layer includes a foam that is capable of conducting heat.

13. An expansion valve for an air conditioning system of a motor vehicle, the expansion valve comprising:
   a housing;
   a sensor;
   a stepping motor or a BLDC motor;
   a valve seat; and
   a valve body interacting therewith;
   wherein the stepping motor or the BLDC motor has a rotor and a stator surrounding the rotor;
   wherein the rotor has a permanent magnet body connected non-rotatably therewith;
   wherein a separating can is provided that surrounds the rotor and separates a wet region on a rotor side from a dry region on a stator side;
   wherein the sensor is connected with the separating can via an adhesive layer formed as a heat-conductive layer; and
   wherein the sensor is configured to detect an axial position and/or a rotation angle of the permanent magnet body.

14. An expansion valve for an air conditioning system of a motor vehicle, the expansion valve comprising:
   a housing;
   a sensor;
   a stepping motor or a BLDC motor;
   a valve seat; and
   a valve body interacting therewith;
   wherein the stepping motor or the BLDC motor has a rotor and a stator surrounding the rotor;
   wherein the rotor has a permanent magnet body connected non-rotatably therewith;
   wherein a separating can is provided that surrounds the rotor and separates a wet region on a rotor side from a dry region on a stator side;
   wherein the sensor is connected with the separating can via an adhesive layer formed as a heat-conductive layer; and
   wherein the adhesive layer includes an elastomer or has a foam that is capable of conducting heat.

15. An expansion valve, comprising:
   a sensor;
   a motor including a rotor and a stator disposed about the rotor, the rotor has a permanent magnet body; and
   a separating can disposed about the rotor, the sensor connected to the separating can;
   wherein the sensor is configured to detect (i) a magnetic field generated by the permanent magnet body, (ii) an axial position of the permanent magnet body, and (iii) a temperature of the magnet body.

16. The expansion valve according to claim 15, wherein the sensor is connected to the separating can via an adhesive layer.

17. The expansion valve according to claim 16, wherein the adhesive layer is formed as a heat-conductive layer.

18. The expansion valve according to claim 15, including a storage device configured to record the temperature measured by the sensor.

* * * * *